United States Patent
Seshadri et al.

(10) Patent No.: US 8,530,090 B2
(45) Date of Patent: Sep. 10, 2013

(54) ENERGY STORAGE DEVICE

(75) Inventors: Hari Nadathur Seshadri, Bangalore (IN); Karthick Vilapakkam Gourishankar, Bangalore (IN); Michael Alan Vallance, Loudonville, NY (US); Charles Dominic Iacovangelo, Saratoga Springs, NY (US); David Charles Bogdan, Jr., Scotia, NY (US); Anbarasan Viswanathan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/617,232

(22) Filed: Sep. 14, 2012

(65) Prior Publication Data
US 2013/0017446 A1 Jan. 17, 2013

Related U.S. Application Data

(62) Division of application No. 12/637,797, filed on Dec. 15, 2009, now Pat. No. 8,377,593.

(51) Int. Cl.
*H01M 4/00* (2006.01)

(52) U.S. Cl.
USPC ........ 429/220; 429/122; 429/163; 429/218.1; 429/102; 452/512

(58) Field of Classification Search
None
See application file for complete search history.

(56) References Cited

U.S. PATENT DOCUMENTS

| 4,623,597 A | 11/1986 | Sapru et al. |
| 5,476,733 A | 12/1995 | Coetzer et al. |
| 5,876,874 A | 3/1999 | Furukawa |
| 2010/0068610 A1* | 3/2010 | Sudworth ............ 429/102 |
| 2011/0104563 A1 | 5/2011 | Galloway et al. |
| 2011/0104570 A1* | 5/2011 | Galloway et al. ........... 429/221 |

FOREIGN PATENT DOCUMENTS

| GB | 2119561 A | 4/1983 |
| GB | 2164786 A | 3/1986 |
| JP | 1021875 A | 1/1989 |
| WO | 2008090344 A1 | 7/2008 |
| WO | 2009082567 A1 | 7/2009 |
| WO | 2011081717 A1 | 7/2011 |

OTHER PUBLICATIONS

PCT International Search Report dated Mar. 3, 2011 and Written Opinion.

* cited by examiner

*Primary Examiner* — Robert Xu
(74) *Attorney, Agent, or Firm* — Francis T. Coppa

(57) ABSTRACT

An energy storage device comprising an anode, electrolyte, and cathode is provided. The cathode comprises a plurality of granules comprising a support material, an active electrode metal, and a salt material, such that the cathode has a granule packing density equal to or greater than about 2 g/cc. A cathode comprising greater than about 10 volume % total metallic content in a charged state of the cathode is also provided.

17 Claims, 3 Drawing Sheets

ENERGY STORAGE DEVICE

CROSS-REFERENCE TO RELATED APPLICATIONS

This application is a divisional of application Ser. No. 12/637,797, filed 15 Dec. 2009, which is hereby incorporated by reference herein in its entirety.

BACKGROUND

The invention includes embodiments that relate to an energy storage device. The invention includes embodiments that relate to an energy storage device with a cathode having high packing density and/or high metallic content.

Rechargeable batteries using sodium as the negative electrode are known in the art. Sodium has a standard reduction potential of −2.71 volts. The sodium anode may be used in liquid form, and the melting point of sodium is 98° C. An ion conducting solid electrolyte (separator) separates the liquid sodium anode from a positive electrode (cathode).

A second, molten electrolyte transports ions to and from the separator on the cathode side. The melting point of the molten electrolyte, along with the temperature-dependent, sodium-ion conductivity of the solid electrolyte, determines the minimum operating temperature of the battery. The cathode should include an active metal having a halide species that is compatible with the solid electrolyte in the charged (oxidized) state. Low solubility of the oxidized cathode material in the molten electrolyte can lead to passivation of the remaining uncharged (reduced) electrode surface and fouling of the pores.

It may be desirable to have an energy storage device that has improved operating life, energy density, and power density over those devices that are currently available.

BRIEF DESCRIPTION

In accordance with an embodiment of the invention, an energy storage device comprising an anode, electrolyte, and cathode is presented. The cathode comprises a plurality of granules comprising a support material, an active electrode metal, and a salt material, wherein the cathode has a granule packing density equal to or greater than about 2 g/cc.

In one embodiment, an energy storage device comprising an anode, electrolyte, and cathode is presented. The cathode comprises a plurality of granules comprising brass, zinc, and sodium chloride, wherein the granules have a multi-modal size distribution, such as, for instance, a bimodal distribution. The cathode has a granule packing density in a range from about 2.0 g/cc to about 2.7 g/cc.

In one embodiment, an energy storage device comprising an anode, electrolyte, and cathode is presented. The cathode comprises a plurality of granules comprising a support material, an active electrode metal, and a salt material, such that a total metallic content of the cathode is greater than about 10 volume % in a charged state of the cathode.

In one embodiment, an energy storage device comprising an anode, electrolyte, and cathode is presented. The cathode comprises a plurality of granules comprising a support material, an active electrode metal, and a salt material, such that a total metallic content of the cathode is greater than about 10 volume % in a charged state of the cathode and the cathode has a granule packing density equal to or greater than about 2 g/cc.

DETAILED DESCRIPTION

Embodiments of the present invention include those that relate to an energy storage device (such as a battery) having a cathode with high packing density and/or a high metallic content. Embodiments also include those that relate to the cathode, an energy storage device using the cathode, and associated methods of making the high packing density cathode.

As used herein, an energy storage device is described using an example of an electrochemical cell (also denoted as "cell"). A cathode is an electrode that supplies or receives electrons during charge/discharge of a battery. An electrode can be used in an energy storage device. The device may include a housing having an interior surface defining a volume. A separator may be disposed in the volume. The separator may have a first surface that defines at least a portion of a cathode chamber, and a second surface that defines an anode chamber, and the cathode chamber is in ionic communication with the anode chamber through the separator. An electrolyte is a medium that provides the ion transport mechanism between the positive and negative electrodes of a cell, and may act as a solvent for the oxidized form of the active electrode metal. The ionic material transported across the separator between the anode chamber and the cathode chamber can be an alkali metal. Suitable ionic material may include one or more of sodium, lithium and potassium. The anodic material is molten during use. The anode chamber may receive and store a reservoir of anodic material.

Figure 1:
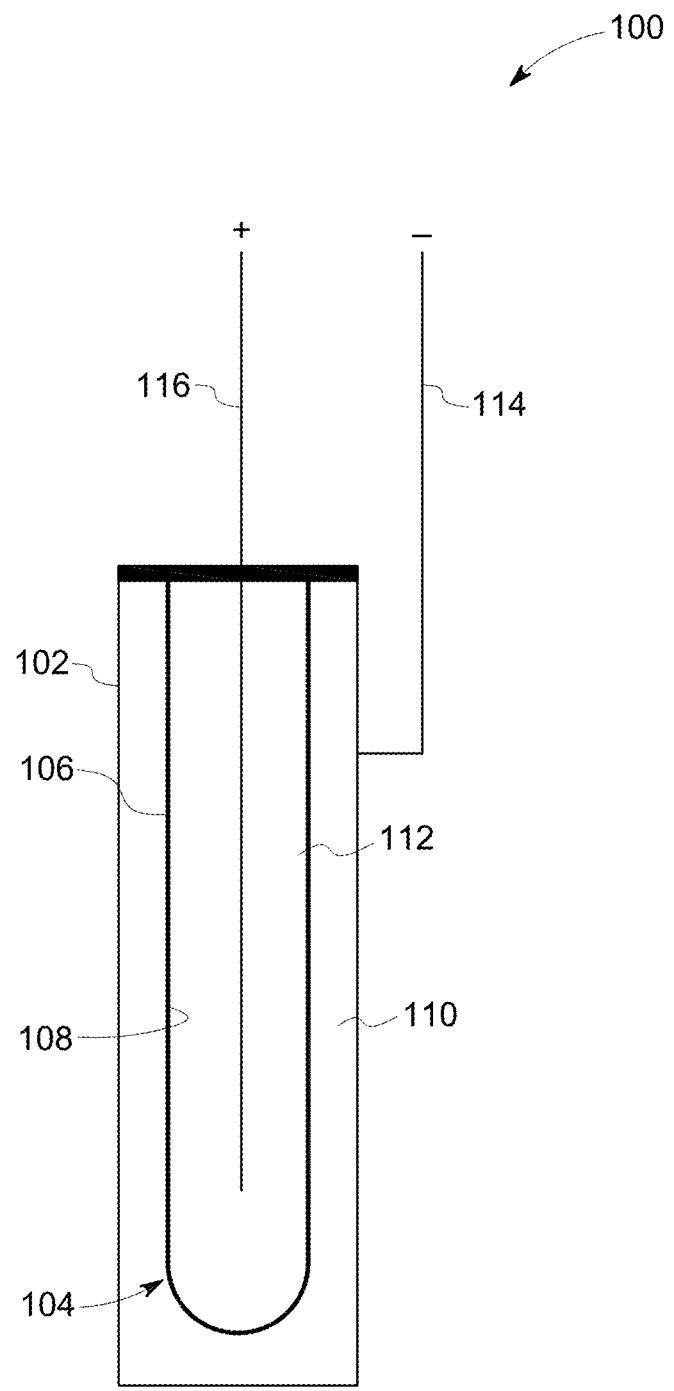
FIG. 1 is a schematic of an electrochemical cell according to one embodiment of the invention.

An electrochemical cell 100 in accordance with an embodiment is shown in FIG. 1. The cell includes a housing 102. The housing includes a separator 104 having an outer surface 106 and an inner surface 108. The outer surface defines a first chamber 110 and the inner surface defines a second chamber 112. The first chamber 110 is an anode chamber including sodium and the second chamber 112 is a cathode chamber including a plurality of salts. The first chamber is in ionic communication with the second chamber through the separator. The first chamber 110 and the second chamber 112 further include, respectively, an anode current collector 114 and a cathode current collector 116 to collect the current produced by the electrochemical cell. In other embodiments, the positions of the anode 114 and cathode 116 can be reversed relative to the embodiment described above, such that the first chamber 110 is the cathode chamber and the second chamber 112 is the anode chamber.

The cathode includes cathodic materials having differing functions, for example, an active electrode metal, a support structure, and a salt material. The active electrode metal is present in the cathode as a participating electrochemical reactant in its fully oxidized state or its fully reduced state, or at some state between full oxidation and reduction. The support structure supports the active electrode metal as the active electrode metal undergoes chemical reaction and allows for a surface upon which solids may precipitate as needed. The active electrode metal can be disposed on to an outer surface of the support structure. The support structure can have a high surface area. The support structure in one embodiment is an electrical conductor and also carries electrons to the reacting surface.

As described in above, in addition to the support structure material and active electrode metal, the cathode comprises a salt material. The salt material provides cations for conduction through the separator and halide ions for oxidizing the metal. Thus the salt material is the principal source of halide ions used to produce the metal halide active electrode species during charging. According to one embodiment, the salt materials include metal chlorides. According to some embodiments, the salt material includes sodium salts. In one embodiment, the salt material is selected from the group consisting of sodium chloride, sodium bromide, and sodium fluoride. In one exemplary embodiment, the salt material comprises sodium chloride.

The cathodic materials and an electrolyte may be disposed in a cathode chamber. At operating temperature the cathode chamber may contain active metal, support structure, salt material, and melt of the electrolyte.

The molten salt homogeneity can be controlled by anchoring the active electrode metal to a support structure surface, rather than filling the cathode chamber with only a liquid melt. That is, the placement of the active electrode metal on the support structure allows for the ability to locate specific materials within an electrochemical cell.

In accordance with an embodiment of the invention, the support structure comprises copper. In a further embodiment, a combination of zinc and copper can be used as a support structure for an energy storage device that includes a zinc electrode. In one embodiment, the combination can be in a mixture form. In another embodiment the zinc and copper are combined in an alloy form. Brass is commercially available in a wide variety of compositions and may be used as a material for a support structure. Small amounts of other metals, such as aluminum or tin, may be present in differing degrees based on the type and purity of brass obtained.

In one embodiment, the support structure does not undergo much, if any, chemical reaction during the charge/discharge. For example, in one embodiment comprising copper as support structure and zinc as an active electrode metal, the zinc functions as a working, active electrode metal in the electrochemical cell. In another embodiment, the support structure participates in the chemical reaction at certain chemical potential. For example, in one embodiment comprising brass as the support material and zinc as the active electrode metal, at certain chemical potential, the zinc in the brass can also participate in the chemical reaction along with the active electrode metal. In another exemplary embodiment, the zinc in the brass support material itself acts as an active electrode metal and participates in the chemical reaction.

One suitable brass material may include milled brass powder that has from about 20 weight percent to about 31 weight percent zinc, from about 0 to about 0.9 weight percent aluminum, and the remainder copper. In one embodiment, substantially all of the zinc in a cathodic material is alloyed with the copper to form brass. In one embodiment, the cathodic material includes copper and zinc, and has less than 1 weight percent of aluminum, tin, or aluminum and tin. In one embodiment, the amount of aluminum or tin, or the combined amount of aluminum and tin, is in a range of from about 0.01 percent to about 0.1 percent based on the weight of the combination of copper and zinc. In one embodiment, the amount of aluminum, tin, or both is zero.

The cathodic materials may be in the form of powder, fiber, foam, or foil. The initial form of the reactants may not be retained once charge/discharge cycling is complete. That is, a cell packed initially with powders may change to porous foam after the first or subsequent use. The foam may be an open cell or reticulated type. In one embodiment, the cathode is in the form of granules. The granule as used herein means a small particle or grain. Granules can be individual or a part of a solid/semi solid structure. A granule may include the cathodic materials described previously, including, the support structure material, active electrode metal, and salt material. In one embodiment, the granules of the cathodic materials are in the form of individual powder particles/grains in the initial state of the cathode, i.e. before the first use. In one embodiment, the granules are a part of the solid structure during and after the first use of the cell. In one embodiment, at least about 75 volume % of the granules in the cell cathode comprise a support structure material, an active electrode metal, and a salt material. In another embodiment, at least about 99 volume % of the granules in the cell cathode comprise a support structure material, an active electrode metal, and a salt material.

A cathode can have varying degrees of granule packing density, for example, depending on the size of granules used and the method used for forming the cathode. As used herein, the "granule packing density" of the cathode means the mass of granules in a given volume. A cathode with high packing density potentially allows several possible desirable aspects. In one embodiment, the increased packing density may mean an increased content of electrochemically active material, allowing for enhanced output energy density of the electrochemical cell relative to cathodes of lower packing density. In another embodiment, the high packing density may result in a higher surface area compared to the cells with lower packing density within a given volume for electrochemical action, which reduces cell polarization and thereby increases the power of the cell. In yet another embodiment, the increased packing density results in a better network of cathodic materials compared to the lower packing density cathodes, leading to a uniform current distribution. A uniform current distribution allows the cell to reproducibly operate over the low-resistance pathways of the cathode, which may increase the stability, life, and predictability of the electrochemical cell.

According to one embodiment of the invention, the cathode of the present invention has a granule packing density equal to or greater than about 2 g/cc. In one embodiment, a granule packing density equal to or greater than about 2 g/cc relates to the cathodes having equal to or above 50 vol % of the granules. In another embodiment, the cathode has a granule packing density equal to or greater than about 2.2 g/cc. In an exemplary embodiment, the cathode has a packing density in a range from about 2.0 g/cc to about 2.7 g/cc. A packing density in a range from about 2.0 g/cc to about 2.7 g/cc covers the range of about 50 vol % to 75 vol % of the granules in the cathode, according to one embodiment. In yet another embodiment, the cathode has a packing density up to about 3 g/cc.

The granules can be regular-shaped, or they can have an irregular shape. In some embodiments of the invention, granules are irregular shaped. When the granules have an irregular shape, nominal size of a granule refers to the dimension of the so-called equivalent sphere, a concept well-known in the field of particle size analysis.

The particle distribution of the granules can be homogeneous or non-homogeneous. In one embodiment, the granules have non-homogeneous particle distribution. In further embodiment, the granules have a multimodal size distribution. A multimodal size distribution is a continuous probability distribution with multiple modes. These multiple modes appear as distinct peaks of local maxima in a size distribution curve. In one embodiment, the granules of cathodic materials have distinct size ranges spanning from about 10 micrometers to about 1000 micrometers. For example, the multimodal size distributed granules of a cathode may comprise a mixture of distinct populations of granules with respective median granule sizes of about 100 micrometers, about 250 micrometers, and about 500 micrometers.

In a particular embodiment, the granules have a bimodal particle size distribution. Bimodal distribution refers to a distribution of particles where two local maxima are present in a size distribution. A bimodal size distribution of granules can provide advantages such as good bulk properties, good mixing properties, and good dissolution profiles.

In a bimodal distribution, the first mode may be in a range of from about 250 micrometers to about 1000 micrometers and the second mode may be in a range of from about 10 micrometers to about 250 micrometers. For example, a suitable bimodal distribution may include a first mode at about 750 micrometer granules and a second mode at about 100 micrometer granules.

In one embodiment of bimodal distribution of granules, wherein the peak heights represent the relative number of particles present in that mode, the ratio of peak height of the first mode representing larger granules to the peak height of the second mode representing smaller granules is from about 90:10 to about 10:90. In another embodiment, the ratio of peak heights of the first mode to the second mode is from about 70:30 to about 30:70. In another particular embodiment, the ratio of peak heights of the first mode to the second mode is about 50:50.

The granules can be designed and formed to increase the cathodic activity during the cell operation. One way of increasing the cathodic activity is by increasing the surface area of the granules. Specific methods can be used to combine the cathodic materials in the granules such that both the active surface area and stability of the granules are increased. For example, in one embodiment, milled powders of support material, active cathode metal, and salt materials are individually sieved, mixed, and compacted to ribbons using pressure. The compaction increases the packing density of the ingredients. The compacted ribbons may be fractured into granules by forcing the ribbon through a screen sieve for example. The granules can be classified by size and fractions of undesirable particle size can be recycled to the start of the granulation process.

The granules of the cathodic materials can be packed using several techniques to form a packed body of the cathode. For example, in one embodiment, the multimodal size distributed granules can be compacted by vibratory packing. In another embodiment, distinctly sized monomodal granules can be mixed and compacted using vibratory packing.

While it is desirable to have high packing density of the cathode, it is also desirable to have a porous network within the cathode to enable the access of the electrolytes to the active electrode metal. Therefore, fabrication of the cathode is often driven by striking a balance between high packing density and pore surface areas of the cathode. Achieving an optimum packing density is one way of balancing the energy density and electrolyte access thereby optimizing the cell functions. In one embodiment, the packing density of the cathode is in a range from about 2.0 g/cc to about 2.7 g/cc.

In one embodiment, the electrolyte of the electrochemical cell has an average melting point of about 155 degrees Celsius (° C.). Therefore, a suitable operating temperature for the electrochemical cell of present embodiment is above 155° C. In one embodiment, the operating temperature for the electrochemical cell may be greater than about 350° C.

The electrolyte may be disposed within the cathode chamber defined by the separator. The electrolyte and the cathodic materials are compatible with each other and thus, in one embodiment, the cathode of the cell is operable at a temperature greater than about 350° C. In a further embodiment, the cathode of the cell is operable at a temperature greater than about 400° C. As used herein, the term "operable" means the capability of the cathode to operate with substantial efficiency.

The energy storage device may have a plurality of current collectors including anode current collectors 114 and cathode current collectors 116 as depicted in FIG. 1. The anode current collector 114 is in electrical communication with the anode chamber 110 and the cathode current collector 116 is in electrical communication with the contents of the cathode chamber 112. Suitable materials for the anode current collector 114 may include W, Ti, Ni, Cu, Mo, steel, or combinations of two or more thereof. Other suitable materials for the anode current collector 114 may include carbon. The cathode current collector 116 may be a wire, paddle or mesh formed from Pt, Pd, Au, Ni, Cu, C, Ti, W, or Mo. The current collector may be plated or clad. In one embodiment, the current collector is free of iron.

According to an embodiment of the invention, the cathode can exist in a "charged" state (meaning fully charged), a "discharged" state (meaning fully discharged), or in a "partially charged" state. The energy storage device described herein may be an electrochemical cell, assembled in the discharged state. Applying a voltage between the anode and the cathode of the electrochemical cell may charge the electrochemical cell. In one embodiment, sodium chloride in the cathode dissolves to form sodium ions and chloride ions during charging. Sodium ions, under the influence of applied electrical potential, conduct through the separator 104 and combine with electrons from the external circuit to form the sodium electrode and chloride ions react with the cathodic material to form metal chloride and donate electrons back to external circuit. During discharge, sodium ions conduct back through the separator reversing the reaction, and generating electrons. The cell reaction is as follows:

The electrochemical cell includes the separator 104 having active area A; and the cell is capable of repeatedly storing and discharging a quantity of charge Q, the resistance between the two terminals is R; and through a full isothermal charge or discharge of Q, a ratio RA/Q remains in a range of from about $1.5 \times 10^{-6}$ ohm-m$^2$/amp-hr to about $9.2 \times 10^{-6}$ ohm-m$^2$/amp-hr.

The active cathode metal may exist in elemental form or as a salt depending on a state of charge of the electrochemical cell. That is, the active cathode metal may be present in elemental form and/or salt form and the ratio of the weight percent of the active cathode metal in elemental form to the weight percent of the salt form may be based on the state of charge. In a charged state, the cathode may comprise less metallic content than in a discharged state because during charging, metals of the cathode get converted into the salt form. During discharging the salt form gets converted into the metallic form and gets deposited over the support structure material and hence the discharged state of the cathode will contain the maximum amount of metallic content. Generally, in a partially charged state, the metallic content of the cathode will be in between the metallic content of the charged state and the metallic content of the discharged state.

According to one embodiment of the invention, a cathode comprising the granules of cathodic materials has a metallic content greater than about 10 volume %. A higher metallic content provides a good 3-dimensional metallic network in the cathode as well as a higher metal surface area, thus reducing ohmic resistance contribution in the cell resulting in a higher power density of the cell. The high metal surface area for electrochemical action and a better 3-dimensional metallic network also allows the cell to reproducibly operate over the low-resistance pathways of the cathode, thus increasing the stability and life of the cell.

In one embodiment, the cathode comprising the granules of cathodic materials has a metallic content greater than about 10 volume % in a discharged state. In certain embodiments, the granules of cathodic materials have a metallic content greater than about 12 volume % in a discharged state. In some embodiments, the granules of cathodic materials have a metallic content greater than about 15 volume % in a discharged state. In yet another particular embodiment, the granules of cathodic materials have a metallic content up to about 23 volume %, in a discharged state.

In one embodiment, the cathode comprising the granules of cathodic materials has a metallic content greater than about 12 volume % in a charged state. In another embodiment, the granules of cathodic materials have a metallic content greater than about 15 volume % in a charged state. In yet another particular embodiment, the granules of cathodic materials have a metallic content in the range up to about 18 volume %, in a charged state.

The distribution of ingredients, and therefore metallic content, need not be homogeneous in either of the initial or the subsequent state. A separator 104 and cathode current collector 116, discussed further herein below, make reasonable reference points for a discussion of metal concentrations. In one embodiment, in a partially charged state, the cathodic material is relatively copper rich proximate the separator 104 and is relatively zinc rich proximate the current collector 116. The ratio of zinc to copper can change over the distance from the separator 104 to the current collector 116 in a manner that is linear or non-linear. In a non-linear instance, the ratio change is semi-exponential. During operation, the reaction of zinc at a first location can occur prior to reacting the zinc at the second location during the at least one charge/discharge cycle.

According to one embodiment of the invention, an energy storage device with a cathode having a plurality of granules is presented. The granule packing density of the plurality of granules in the cathode is equal to or greater than about 2 g/cc, while the total metallic content of the cathode is greater than about 10 volume % in a charged state of the cathode. In a further embodiment, the granules have a multimodal size distribution and a packing density greater than about 2 g/cc.

A plurality of the electrochemical cells can be organized into an energy storage system. Multiple cells can be connected in series or parallel. For convenience, a group of connected cells may be referred to as a module or pack. The ratings for the power and energy of the module may depend on such factors as the number of cells in the module. Other factors may be based on end-use application specific criteria.

A suitable energy storage system may have an application specific Power to Energy ratio of less than 10 to 1 hour$^{-1}$. In one embodiment, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

The following examples illustrate methods and embodiments in accordance with the invention, and as such do not limit the claims. Unless specified otherwise, all ingredients are commercially available from common chemical suppliers.

EXAMPLE 1

Cathode Granule Packing Density

Two batches of cathodic materials with different granule packing densities were prepared. The solid components of a cathodic material include zinc (−100 mesh, 99.9% metals basis), brass (−325 mesh, 99.9% metals basis, Cu ~72%, Zn ~27% by weight), sodium chloride (99.99%), and aluminum powder (−100+325 mesh, 99.97% metals basis). To increase the surface area for improved mass transfer, the sodium chloride was milled to −200 mesh in a laboratory mill in a dry glove box. These powders were mixed and subjected to granulation.

The first batch (Batch 1) contained about 84.8 g of brass, 37.5 g of metallic zinc, 113.6 g of sodium chloride and 1 g of aluminum. The second batch (Batch 2) contained about 102.7 g of brass, 45.5 g of metallic zinc, 137.6 g of sodium chloride and 1.2 g of aluminum.

Granulation was carried out in three stages. First, the mixed powders were screw-fed to a set of rolls of a bench-top granulator having about 15-mm wide rolls, and a maximum roll pressure of 120 MPa. The mixed powders were compacted, using 120 MPa pressure and a roll speed of 4 rpm, into a continuous 15 mm wide ribbon. The resulting ribbon was then broken up into granules by screw feeding to a 1.2-mm (16-mesh) sieve, and forcing the ribbon by a roller through the sieve. The granules were then classified using a 300-μm sieve.

The cathodic material was disposed in the volume of the cell housing and within the separator tube, and functioned as the working cathode for the cell. The brass functioned as one current collector. The housing functioned as a second current collector. To minimize cell exposure to oxygen and moisture, the cell fabrication process was carried out in a glove box. The cell was placed on a vibratory table, and was vibrated at high frequency for 30 s to facilitate packing of the granule bed to the desired packing density.

Granules of size greater than about 300 μm were used for batch 1. Batch 2 contained about 79 wt % of granules greater than 300 μm size and about 21 wt % of granules with size less than 300 μm. The packing density of batch 1 was about 1.85 g/cc and that of batch 2 was about 2.24 g/cc.

Figure 2:
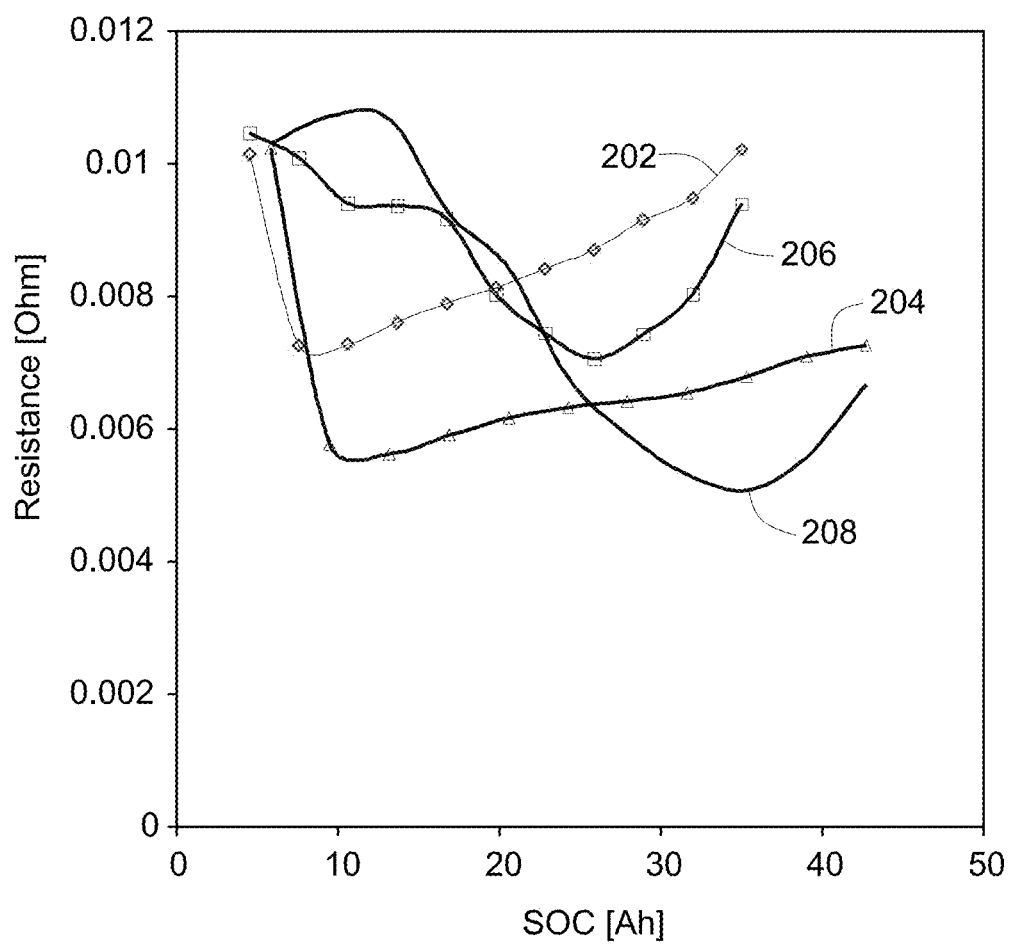
FIG. 2 is a graphical representation of cell resistances versus the state of charge (SOC) of electrochemical cells according to one embodiment of the invention.

The cathode compartment of the cell was charged with about 107.7 g sodium tetrachloroaluminate powder for batch 1 and about 81.6 g sodium tetrachloroaluminate powder for batch 2. The cell was tested at 450° C. FIG. 2 graphically depicts the cell resistances in ohms of batch 1 and batch 2 versus the state of charge (SOC) in ampere-hour (Ah) of the cells under test.

In FIG. 2, curves 202 and 204 illustrate the cell resistances of batch 1 and batch 2 respectively during charge and curves 206 and 208 illustrate the cell resistances of batch 1 and batch 2 respectively during discharge. It can be seen from the graph that the cell resistances at high SOC are comparatively lower for the batch 2 than batch 1 during charge as well as discharge. Also the cell energy at the end of 2 hour half cycle time during discharge for batch 2 was found to be about 64 Wh compared to about 52 Wh of batch 1. Therefore the cell of batch 2 with higher granule packing density provides higher energy and lower resistance compared to the cell of batch 1 having a lower granule packing density.

EXAMPLE 2

Metallic Content of the Cathode

Figure 3:
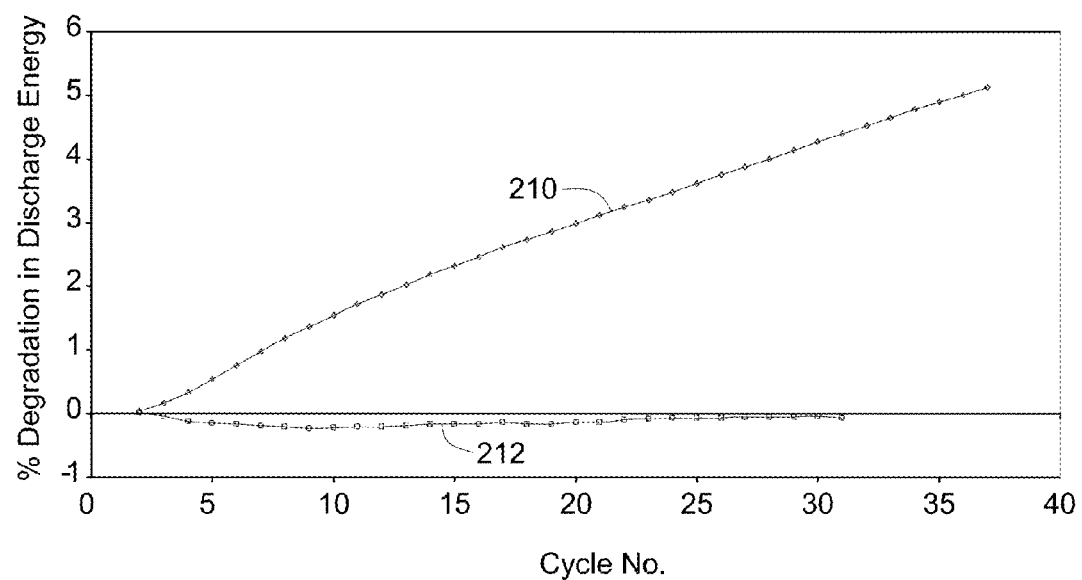
FIG. 3 is a graphical representation of degradation in discharge energy with number of cycles of electrochemical cells according to one embodiment of the invention.

FIG. 3 depicts the degradation in discharge energy with cycles for two batches (Batch 3 and Batch 4) of cathodic materials with different metal contents in the cathode granules. The materials used were the same as described in Example 1 above and the contents of the cathode include 51.7 g of brass, 22.9 g of metallic zinc, 69.4 g of sodium chloride and 0.9 g of aluminum for batch 3 and 46.5 g of brass, 35 g of metallic zinc and 62.5 g of sodium chloride for batch 4. Size of the granules used was about all coarse (>300 μm) for batch 3 and a mixture 30 wt % coarse −70 wt% fine (<300 μm) for batch 4. The granule packing density was about 1.9 g/cc for batch 3 and 2.7 g/cc for batch 4. Batch 3 has a metallic content of about 8.5 vol % of cathode at the end of charge (EOC) and batch 4 had about 12.5 vol % of cathode at the end of charge. The cells were tested at a temperature of about 430° C. Comparison of batch 3 and batch 4 degradation densities 210, 212 in FIG. 3 shows that batch 4 with a higher metallic content of the cathode was more stable compared to batch 3 with a comparatively lower metallic content.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An energy storage device comprising an anode, electrolyte, and cathode, wherein the cathode comprises a plurality of granules comprising a support material, an active electrode metal, and a salt material, wherein a total metallic content of the cathode is greater than about 10 volume % in a charged state of the cathode, and wherein the support material comprises copper.

2. The energy storage device of claim 1, wherein the metallic content of the granules is greater than about 14 volume % in the charged state of the cathode.

3. The energy storage device of claim 1, wherein the support material comprises zinc and copper.

4. The energy storage device of claim 1, wherein the support material comprises brass.

5. The energy storage device of claim 1, wherein the active electrode metal comprises zinc.

6. The energy storage device of claim 1, wherein the salt material is sodium chloride.

7. The energy storage device of claim 1, wherein the cathode has a granule packing density equal to or greater than about 2 g/cc.

8. The energy storage device of claim 7, wherein the cathode has a granule packing density in a range from about 2.0 g/cc to about 2.7 g/cc.

9. An energy storage device comprising an anode, electrolyte, and cathode, wherein the cathode comprises a plurality of granules comprising a support material, an active electrode metal, and a salt material, wherein a total metallic content of the cathode is greater than about 10 volume % in a charged state of the cathode and the cathode has a granule packing density equal to or greater than about 2 g/cc.

10. The energy storage device of claim 9, wherein the granule packing density is in a range from about 2.0 g/cc to about 2.7 g/cc.

11. The energy storage device of claim 9, wherein the plurality of granules has a multimodal size distribution.

12. The energy storage device of claim 11, wherein the multimodal size distribution is a bimodal distribution.

13. The energy storage device of claim 11, wherein a first mode of the multimodal size distribution is less than about 250 micrometers.

14. The energy storage device of claim 13, wherein at least 30 volume % of the plurality of granules in the first mode has median size lower than about 250 micrometers.

15. The energy storage device of claim 11, wherein a second mode of the multimodal size distribution is greater than about 250 micrometers.

16. The energy storage device of claim 15, wherein at least 30 volume % of the plurality of granules in the second mode has median size greater than about 250 micrometers.

17. The energy storage device of claim 11, wherein a second mode of the multimodal size distribution is greater than about 500 micrometers.

* * * * *